US008561127B1

(12) United States Patent
Agrawal et al.

(10) Patent No.: US 8,561,127 B1
(45) Date of Patent: Oct. 15, 2013

(54) CLASSIFICATION OF SECURITY SENSITIVE INFORMATION AND APPLICATION OF CUSTOMIZABLE SECURITY POLICIES

(75) Inventors: Sunil Agrawal, Milpitas, CA (US); Vivek Hebbar, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1078 days.

(21) Appl. No.: 11/365,030

(22) Filed: Mar. 1, 2006

(51) Int. Cl.
*H04L 29/06* (2006.01)

(52) U.S. Cl.
USPC ................ 726/1; 726/13; 726/26; 713/154; 713/166

(58) Field of Classification Search
USPC ......... 713/151, 152, 166, 150, 153, 154, 164, 713/165, 167, 193; 726/11, 12, 14, 1, 22, 726/26, 13; 707/754, 755, 756, 757, 783, 707/786
See application file for complete search history.

(56) References Cited

U.S. PATENT DOCUMENTS

| | | | |
|---|---|---|---|
| 5,126,728 A * | 6/1992 | Hall | 726/30 |
| 5,602,918 A | 2/1997 | Chen et al. | |
| 5,606,668 A | 2/1997 | Shwed | |
| 5,701,342 A * | 12/1997 | Anderson et al. | 713/176 |
| 5,960,080 A * | 9/1999 | Fahlman et al. | 380/252 |
| 5,991,709 A * | 11/1999 | Schoen | 704/1 |
| 6,178,505 B1 * | 1/2001 | Schneider et al. | 713/168 |
| 6,253,203 B1 * | 6/2001 | O'Flaherty et al. | 707/9 |
| 6,499,107 B1 | 12/2002 | Gleichauf et al. | |
| 6,678,822 B1 * | 1/2004 | Morar et al. | 713/182 |
| 6,763,469 B1 | 7/2004 | Daniely | |
| 6,804,783 B1 | 10/2004 | Wsinger, Jr. et al. | |
| 6,922,696 B1 * | 7/2005 | Lincoln et al. | 712/200 |
| 7,010,681 B1 * | 3/2006 | Fletcher et al. | 713/154 |
| 7,174,563 B1 | 2/2007 | Brownlie et al. | |
| 7,472,422 B1 * | 12/2008 | Agbabian | 726/25 |
| 7,512,791 B1 * | 3/2009 | Sato | 713/166 |
| 7,603,549 B1 * | 10/2009 | Kay | 713/160 |
| 7,865,742 B2 * | 1/2011 | Staddon et al. | 713/193 |
| 2002/0073313 A1 * | 6/2002 | Brown et al. | 713/165 |
| 2003/0149870 A1 * | 8/2003 | Wookey et al. | 713/155 |
| 2004/0230792 A1 * | 11/2004 | McCarty | 713/153 |
| 2005/0044409 A1 * | 2/2005 | Betz et al. | 713/201 |
| 2005/0068935 A1 * | 3/2005 | Bajko et al. | 370/351 |
| 2005/0132070 A1 * | 6/2005 | Redlich et al. | 709/228 |
| 2005/0182957 A1 * | 8/2005 | Della-Libera et al. | 713/200 |
| 2005/0213763 A1 * | 9/2005 | Owen et al. | 380/270 |
| 2005/0288939 A1 * | 12/2005 | Peled et al. | 705/1 |
| 2006/0048210 A1 * | 3/2006 | Hildre et al. | 726/1 |
| 2006/0085469 A1 * | 4/2006 | Pfeiffer et al. | 707/102 |
| 2006/0112110 A1 * | 5/2006 | Maymir-Ducharme et al. | 707/100 |
| 2006/0190606 A1 * | 8/2006 | Kohavi | 709/226 |
| 2006/0218604 A1 * | 9/2006 | Riedl et al. | 725/91 |
| 2007/0118893 A1 * | 5/2007 | Crawford | 726/11 |

* cited by examiner

*Primary Examiner* — Eleni Shiferaw
*Assistant Examiner* — Hilary Branske
(74) *Attorney, Agent, or Firm* — Kilpatrick Townsend & Stockton LLP (57) ABSTRACT

Classification of security sensitive information and application of customizable security policies are described, including classifying information as security sensitive information at an application level, the security sensitive information being associated with a security sensitive category, determining a security policy for the security sensitive information, the security policy being configured to secure the security sensitive information, and applying the security policy to the security sensitive information at the application level, the policy being based on the security sensitive category.

22 Claims, 8 Drawing Sheets

CLASSIFICATION OF SECURITY SENSITIVE INFORMATION AND APPLICATION OF CUSTOMIZABLE SECURITY POLICIES

FIELD OF THE INVENTION

The present invention relates generally to software. More specifically, classification of security sensitive information and application of customizable security policies are described.

BACKGROUND OF THE INVENTION

Protecting sensitive information is a difficult problem, affecting information and privacy rights alike. Unintended, mischievous, or malicious attacks can occur in order to access sensitive (i.e., private, personal, or commercially valuable) information and data. Techniques such as spoofing (e.g., phishing), pharming, trojans, viruses, worms, and the like are often used to intercept, modify, delete, or transfer sensitive data found in messages and transactions. Sensitive data can include personal (e.g., name, address, social security numbers, family information, and other personally identifiable information, and the like), financial (e.g., bank account and routing numbers, credit card numbers, billing addresses, and the like), business or commercial (e.g., trade secrets, confidential business information, partner and customer lists, sales data, and the like) and other data and information, which may be intercepted and used for unauthorized or malicious purposes, often harming the original or genuine user due to identity theft, business disparagement, several financial loss, and credit history damage. Protecting sensitive data transmitted from end user applications is difficult and conventional techniques are problematic.

Typically, data is secured (e.g., encrypted/decrypted) using security techniques such as passwords (i.e., authentication) and encryption. However, these measures are often indiscriminate and general, without regard to the type or nature of information and data being sent or used in a particular transaction. Web browsers and other applications provide warnings of sending any information over an unsecure channel, layer, or to an untrusted domain, but do not provide the user with options beyond either sending or aborting the message or transaction. Conventional solutions do not provide application-level security based on the specific nature of the message, information, data, or domain involved. Instead, users receive vague warnings of a potential unsecure transmission and are offered the opportunity to abort the transaction without an opportunity to perform any type of remedial action to correct the unsecure nature of the information. In other words, conventional techniques do not consider subjective factors such as the type of data being sent, the nature of the data being sent, or the application being used, which results in general security measures that offer only a choice of aborting a transmission or a warning, leading to delay, expense, and the expenditure of time and labor while attempting to correct the unsecure situation. Some conventional solutions provide data security at the network layer (i.e., OSI or Internet application architectural model), but these solutions rely on detecting system administrator-defined IT keywords in TCP/IP data packets, which are tailored to the enterprise, not a particular application nor a particular user. Conventional data security solutions (e.g., intrusion detection systems (IDS) and intrusion prevention systems (IPS)) are ineffective, inefficient, or burdensome, often providing false positives of threats, filtering data based on domain names, which can be spoofed, and leaving application data vulnerable to attack. Further, conventional data solutions can be subverted by sending data over an encrypted data channel (e.g., secure socket layer (SSL)) or sending encrypted messages (e.g., encrypted Form Definition Files (FDF)).

Thus, what is needed is data security without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

Techniques for classifying security sensitive information and applying security policies in an application are described. In some embodiments, techniques may include determining if information in an application is security sensitive. If security sensitive information is determined, then a security sensitive category (e.g., high, medium, low, custom, or others) may be applied to the information and associated data.

The category may be used to determine which, if any, security policies ("policies") are applied to security sensitive information in order to protect (e.g., encrypt) against unwanted intrusion, detection, attack, or interception. In some examples, policies may be determined and based on a security sensitive category and applied to information and associated data that fall under the category. In other examples, policies may be determined and applied differently.

Figure 1:
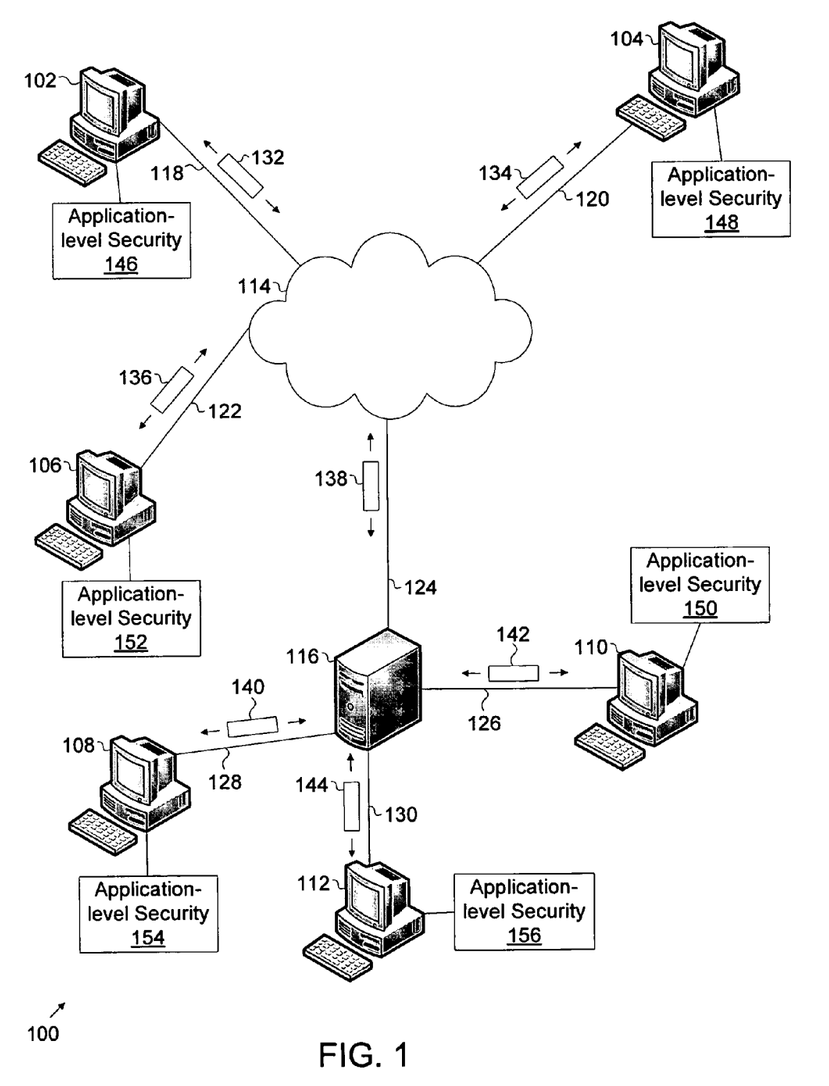
FIG. 1 illustrates an exemplary application-level security system, in accordance with an embodiment.

FIG. 1 illustrates an exemplary application-level security system, in accordance with an embodiment. Here, system 100 includes clients 102-112, network 114, server 116, connections 118-130, data packets 132-144, and application-level security modules 146-156. Clients 102-112 may be implemented as client computers, nodes, processors, or other "endpoints" of a network using software such as desktop applications for authoring, publishing, creating, modifying, editing, or performing other document operations. Applications may include computer programs or software for use on a client (including server-side software for use by one or more clients) such as those developed by Adobe Systems Incorporated of San Jose, Calif., Microsoft Corporation of Redmond, Wash., Intuit, Incorporated of Mountain View, Calif., and others.

In some examples, application-level security modules 146-156 may be used to perform data collection, classification, categorization, security policy determination, and security policy application. Data collection may be performed by an application on clients 108-112 (e.g., Microsoft Word, Internet Explorer, Mozilla Firefox, and others). In some examples, data collection may also be performed by application-level security modules 146-156 for certain applications (e.g., Adobe® Acrobat®) and document formats (e.g., PDF). Classification (i.e., classifying information and associated data (hereafter "information") as security sensitive), categorization (i.e., identifying a type associated with the classified security sensitive information), and security policy determination may be performed by application-level security modules 146-156. Security policy application may be performed by either application-level security modules 146-156 or by the application-in-use (i.e., "native application") communicating data to application-level security modules 146-156 (shown and described further in connection with FIG. 2A). The above-described operations may be performed on information stored and communicated using data packets 132-144.

In some examples, as packets are encrypted or decrypted, application-level security modules 146-156 may be configured to classify security sensitive information and apply security policies ("policies") based on categories to protect the information. Here, server 116 and clients 108-112 represent a network that is connected to network 114, which may be implemented as the Internet, a local area network (LAN), wide area network (WAN), wireless local area network (WLAN), virtual private network (VPN), or other type of public or private network. Further, application-level security techniques such as those implemented in application-level security modules 146-156 are described below in greater detail and may be implemented without regard to a particular type of public or private network.

Information may be classified as security sensitive and protected by applying customizable, user-specified, or system-determined policies that encrypt or otherwise protect the information. Here, customizable may refer to policies that are created or modified by a user, established as default policies, and the like. In some examples, security sensitive information may be information or data related to personal identification, financial, medical, family, business or commercial, military, or other private purposes. In other words, information not intended for public dissemination may be classified as security sensitive and protected at an application level (i.e., application level as defined by application architectural schema such as OSI, Internet, and others) by using application-level security modules 146-156 implemented with applications sending messages or performing transactions in system 100. By applying policies to information (e.g., data packets 132-144), encryption and other security techniques may be used to classify and protect information from interception, reception, or misuse by uninvited parties (e.g., phishers, spoofers, hackers, crackers, and the like). System 100, its components, and the techniques described herein may be implemented using hardware, software, circuitry, or a combination thereof. Further, software implementations may be performed using various programming and formatting languages and protocols including, but not limited to C, objective C, C++, C#, Java, XML, HTML, XHTML, WSDL, and others. Still further, system 100 and the above-described components may also be varied and are not limited to the descriptions provided above.

Figure 2A:
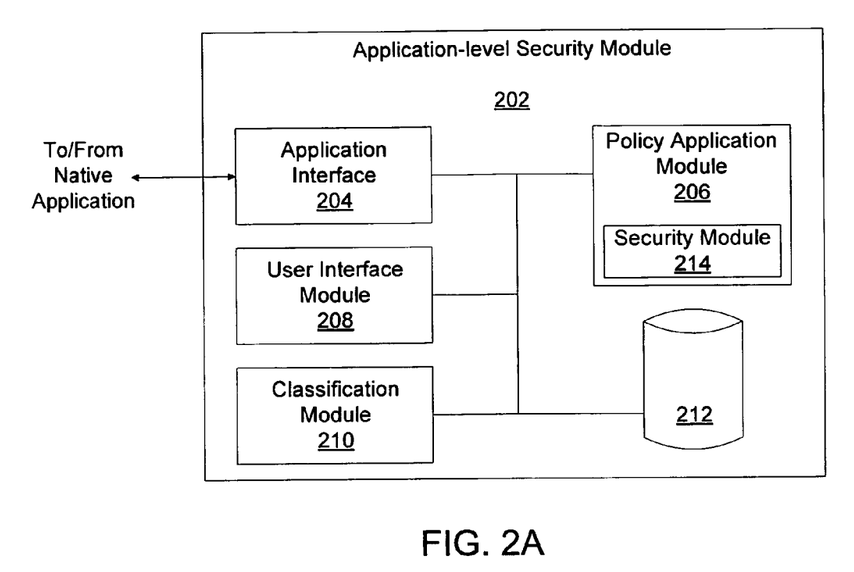
FIG. 2A illustrates an exemplary application-level security module, in accordance with an embodiment.

FIG. 2A illustrates an exemplary application-level security module, in accordance with an embodiment. Here, application-level security module 202 includes application interface 204, policy application module 206, user interface module 208, classification module 210, repository 212, and security module 214. In some examples, application-level security module 202 is substantially similar to application-level security modules 146-156 described above in connection with FIG. 1.

Referring back to FIG. 2, application interface 204 may be used to call and exchange data between application-level security module 202 and a native application being used for desktop word processing, document authoring or editing, financial spreadsheet, graphics design, or other purposes. Application-level security module 202 may be implemented as part of a native application or as a separate application on a client, server, or other computing device. Here, application interface 204 provides a communication interface between application-level security module 202 and the native application, an operating system, or other program that passes information for evaluation to determine whether security sensitive information is present.

Policy application module 206 may be implemented to apply security policies to security sensitive data. For example, if a user specifies that information having a "high" security sensitivity is to be encrypted, this policy may be stored in repository 212. When security sensitive information belonging to a "high" category is found, the policy may be retrieved by policy application module 206 from repository 212 and applied to the information.

In some examples, user input may be provided to application-level security module 202 using user interface module 208. User input may be provided for a variety of purposes, including defining policies, specifying parameters and rules governing the application of policies, establishing security sensitive categories, explicitly specifying and identifying information as security sensitive, and the like. User input may be provided for other purposes and is not limited to the examples provided.

Classification module 210 may be implemented as logic configured to evaluate information to determine whether a security sensitive category is applicable. If so, policy application module 206 may be configured to apply one or more policies based on the security sensitive category provided by classification module 210. If security sensitive information is not present, then classification module 210 may be configured to take no action. In other examples, classification module 210 may be implemented and configured differently and is not limited to the examples described above.

In some examples, repository 212 may be implemented as a data repository, database, or other data structure configured to store information and policies. In other examples, repository 212 may be configured to store policies. In still other examples, repository 212 may be configured to cache copies of security sensitive information, which may be used for pattern recognition when evaluating information to determine whether a security sensitive category should be applied. Rules, parameters, patterns, categories, and other information may be stored in tables, matrices, or other data structures that may be operated upon by logic implemented in the above-described modules of application-level security module 202.

In some examples, security module 214 may be implemented as part of policy application module 206. In other examples, security module 214 may be implemented as part of the native application that application-level security module 202 supports. In still other examples, security module 214 may be implemented separately from the native application and application-level security module 202. Security module 214 may also be implemented as part of another module, including those shown. Application-level security model 214 may also be implemented as a custom server configured to apply different security policies to different sections, sets, or subsets of security sensitive information as opposed to applying a single policy to an entire set of information. Alternatively, a security policy may also be applied to security sensitive information based on the highest security sensitivity classification in a complete set of data. For example, a document may have several sets or subsets of security-sensitive information, each having a different security sensitive classification. A security policy may be applied based on the highest security sensitive classification. As another example, a rule may be established that if a document has multiple security sensitive information classifications, if at least one of the classifications is "medium" or higher, then a security policy for encrypting data with a "high" security sensitive classification is applied. In other examples, different policies and rules for applying these policies may be applied. Further, the above-described modules may be implemented as software, hardware, circuitry, or a combination thereof to provide logic configured to perform the above-described operations and variations thereof.

Figure 2B:
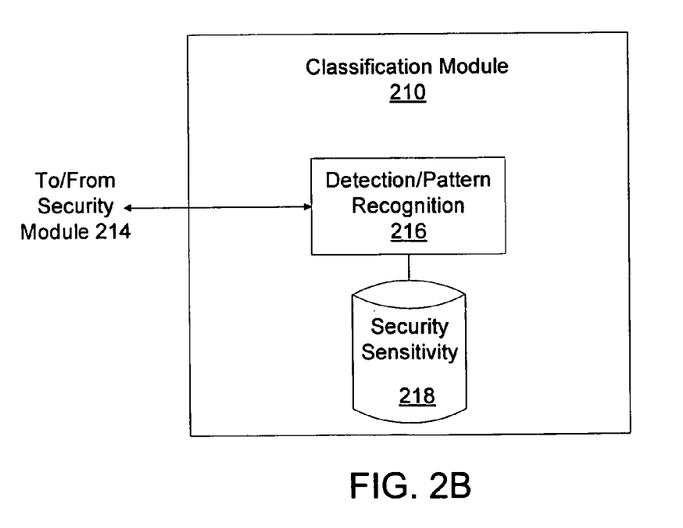
FIG. 2B illustrates an exemplary classification module of an application-level security module, in accordance with an embodiment.

FIG. 2B illustrates an exemplary classification module of an application-level security module, in accordance with an embodiment. Here, classification module 210 is further described and shown in data communication with security module 214. Classification module 210 may be implemented to include detection/pattern recognition module 216, and security sensitivity repository 218. In some examples, security module 214 may be implemented as logic apart from classification module 210, configured to provide encryption, authentication, or other security techniques for protecting information. In other examples, security module 214 may provide security techniques (e.g., public or private key encryption, authentication, and others) that are associated with a corresponding security sensitive category. For example, information having a security sensitive category of "high" may invoke security module 214 to provide, subject to direction by policy application module 206, private/public key encryption (e.g., PKI) to the information. As another example, security module 214 may apply a security policy to encrypt security sensitive information by automatically encrypting unsecure data by querying a DNS server for the intended recipient. If the query results in the return of a data encryption public key, this may be applied automatically to encrypt the unsecure data prior to sending it to the intended recipient. Techniques such as DomainKeys as developed by Yahoo, Inc. of Sunnyvale, Calif. may be used to verify the domain of an e-mail sender and the integrity of the message being sent. If a fraudulent domain is found, the e-mail may be dropped, deleted, or otherwise prevented from transmission, thus defeating spoofing or other domain forging techniques. In other examples, security module 214 may be implemented differently and different security techniques may be applied and are not limited to the descriptions provided above.

As information is evaluated (i.e., received or assembled in data packets prior to transmission to a destination client or endpoint) pattern recognition or detection may be applied by detection/pattern recognition module 216. Here, detection/pattern recognition module 216 may be implemented as logic configured to detect patterns in information and associated data to determine whether security sensitive data is present. If security sensitive data is present, a signal, message, or other data may be sent from classification module 210 (i.e., on a bus) to policy application module 206 (FIG. 2A) in order to determine what, if any, policies should be applied to the information for protection. Security sensitive categories may be stored in security sensitivity repository 218.

In some examples, security sensitivity repository 218 may be implemented as a data repository, database, or other data structure configured to store data associated with security sensitive categories. As an example, a user may specify a security sensitive category that may be used to classify financial information as having a security sensitive category of "high." The security sensitive category, which may explicitly list specific types of information (e.g., credit card numbers, bank account numbers, wire transfer numbers, bank routing numbers, account balances, and the like) that fall under this category. Further, the security sensitive category may also be stored with a pointer or other indicator that suggests which, if any, policies are to be applied to security sensitive information that falls under this category. Categories may also be stored for different security sensitivity levels (e.g., medium, low, custom (i.e., user-defined)). In other examples, security sensitive categories may be defined differently and are not limited to the examples described above.

In some examples, policy application module 206, including security module 214, may encrypt the data in security sensitive information prior to sending a message or completing a transaction. The security sensitive information and associated data are encrypted at the application-level, which may eliminate or minimize vulnerabilities by relying on network-level or enterprise-wide data security techniques (e.g., firewall, encryption algorithms, and the like). Security techniques may be applied based on the subjective nature of the information in an application. Some information may be security sensitive and other information may not be security sensitive. The described techniques allow for application of policies to security sensitive information, which is an efficient application of security measures to information and data that the user deems private while allowing non-security sensitive information in messages or transactions to be sent without unnecessary encryption. Classification of security sensitive information at the application level enables information and associated data to be classified and protected (i.e., by applying policies to protect the information) on a case-by-case basis rather than rely on encryption of an entire data transport or network layer or tunnel. Information is protected on a subjective basis, encrypting, for example, information that requires security policies and allowing unsecure transmission of information and associated data that does not require security policies. Thus, personally-identifiable, financial, confidential, or other sensitive information may be protected while allowing non-sensitive information to pass without burdening data transport or protecting all information (including information that is not security sensitive). Classification module 210, security module 214, detection/pattern recognition module 216, and security sensitivity repository 218 may be implemented using software, hardware, circuitry, or a combination thereof. Further, classification module 210, security module 214, detection/pattern recognition module 216, and security sensitivity repository 218 may be implemented differently and are not limited to the exemplary descriptions provided above.

Figure 3:
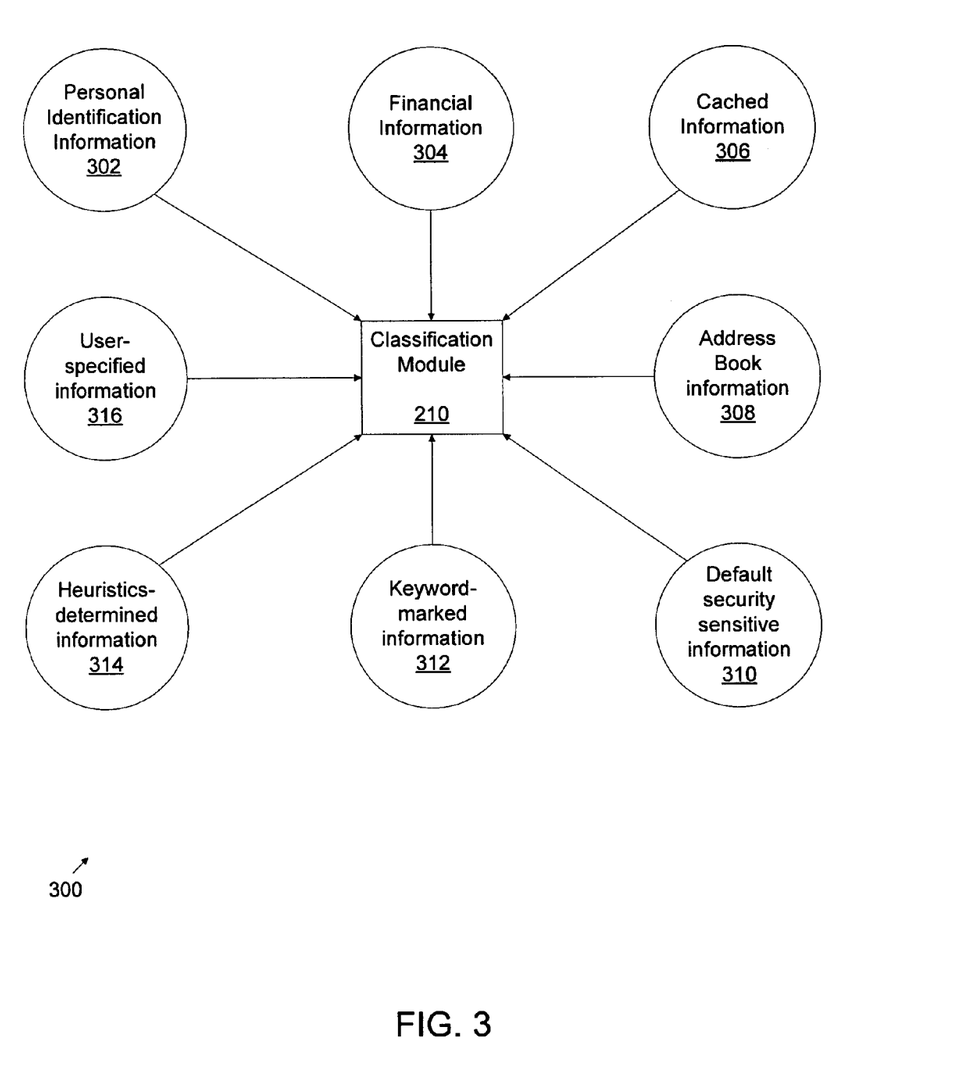
FIG. 3 illustrates exemplary types of information detected by a classification module, in accordance with an embodiment.

FIG. 3 illustrates exemplary types of information detected by a classification module, in accordance with an embodiment. Here, some types of information that may be classified as security sensitive information are described. View 300 illustrates classification module 210 (FIGS. 2A and 2B) that may be configured to classify several types of information as security sensitive. In some examples, security sensitive information may include personal identification information 302, financial information 304, cached information 306, address book information 308, default security sensitive information 310, keyword marked information 312, heuristically-determined security sensitive information 314, and user-specified information 316. Other types of information may be classified as security sensitive information and the categories shown are neither comprehensive nor all-inclusive.

Generally, categories 302-316 may include information that a user considers private and is not intended for public dissemination or sharing. In some examples, personal identification information 302 may include personally-identifiable information regarding an individual such as name, age, home and business address, telephone numbers, physical characteristics, medical information, and the like. Financial information 304 may include income, job information, bank account information, credit card numbers, bank routing numbers and addresses, financial transaction information, securities (e.g., stock portfolio information), and the like. Cached information 306 may be information stored or cached on an individual's computer or system memory, including information suggesting or indicating a particular user's online preferences, behavior, and activity. Cached information 306 may also include documents, files, and other types of information used by the user, but not permanently erased. Address book information 308 may include information stored in an address book, contact database, or other similarly-purposed data structure such as those included with applications developed by Adobe Systems Incorporated of San Jose, Calif. or Microsoft Corporation of Redmond, Wash. Other databases or repositories configured for storing and providing addresses (e.g., residential, mailing, business, and the like), contact information (telephone number, e-mail addresses, fax numbers, website addresses, and the like) for a user may also be included in this type of information (i.e., address book information 308).

In some examples, default security sensitive information 310 may include information that is user or system-specified as belonging to a security sensitive category. Any type of information may be categorized (e.g., high, medium, low, custom, or the like) as security sensitive and established as a default setting. In other words, if information has a default security sensitive category assigned, application-level security module 202 (FIG. 2A) may automatically apply policies to protect (e.g., encrypt) the information. In other embodiments, default security sensitive information 310 may be handled differently.

Keyword-marked information 312, in some examples, may include information marked or "tagged" with keywords or other information to indicate security sensitivity or a security sensitive category. For example, documents authored or edited using Acrobat® developed by Adobe Systems Incorporated of San Jose, Calif. may have form fields, annotation definitions, or other areas where information entered is automatically classified as security sensitive. Specific form fields, annotation definitions, or other information may be automatically classified as security sensitive by appending, marking, or tagging the security sensitive information with keywords that indicate security sensitivity. In some examples, the keywords may also indicate a security sensitive category. When creating or editing forms or other documents using an application that has functionality such as that described above for classification module 210 (FIGS. 2A-2B) or application-level security module 202 (FIG. 2A), specific fields may be identified as being security sensitive. Thus, any information entered into those fields may be categorized as security sensitive. In other embodiments, keyword-marked information 312 may be classified differently and is not limited to the examples provided above.

In some examples, heuristics-determined information 314 may include information that, when a heuristics algorithm is applied, is determined to be security sensitive. As an example, heuristics algorithms may be used to identify and classify information included in a document. In some examples, heuristics algorithms may be used to identify credit card information, social security numbers, and other information or data that may be found in a larger body of text or other information included in a document. In other examples, heuristics algorithms may be implemented differently.

In some examples, user-specified information may be indicated as security sensitive. Users may include end users (e.g., individuals using an application such as those mentioned above on a desktop or notebook computer), system and network (i.e., IT) administrators, managers, or other individuals who may be using an application and indicate security sensitive information manually. As an example, an IT administrator for a hospital network may manually enter medical terms (e.g., condition, injury, treatment, symptoms, medication, name, insurance provider, insurance account number, medical/treatment history, and the like) that, when detected, trigger security sensitive actions that classify, detect, and then send security sensitive information. Further, users may explicitly specify a security sensitive category for certain information. For example, a user interface may be provided in an application (e.g., Acrobat®, Word, PowerPoint®, and others) for a user to identify information that may be classified as security sensitive. User-specified information 316, and categories 302-314, may be stored in a repository, database, or other data structure (e.g., 212 (FIG. 2A), 218 (FIG. 2B)) and used to compare and identify security sensitive information using techniques such as pattern recognition. In other examples, different techniques may be implemented for user-specification of security sensitive information.

The above types of information are illustrative and representative of some types of information that may be classified as security sensitive. Other types of information beyond those described above may also be classified as security sensitive. Further, security sensitive information may be handled differently and is not limited to the examples provided above.

Figure 4:
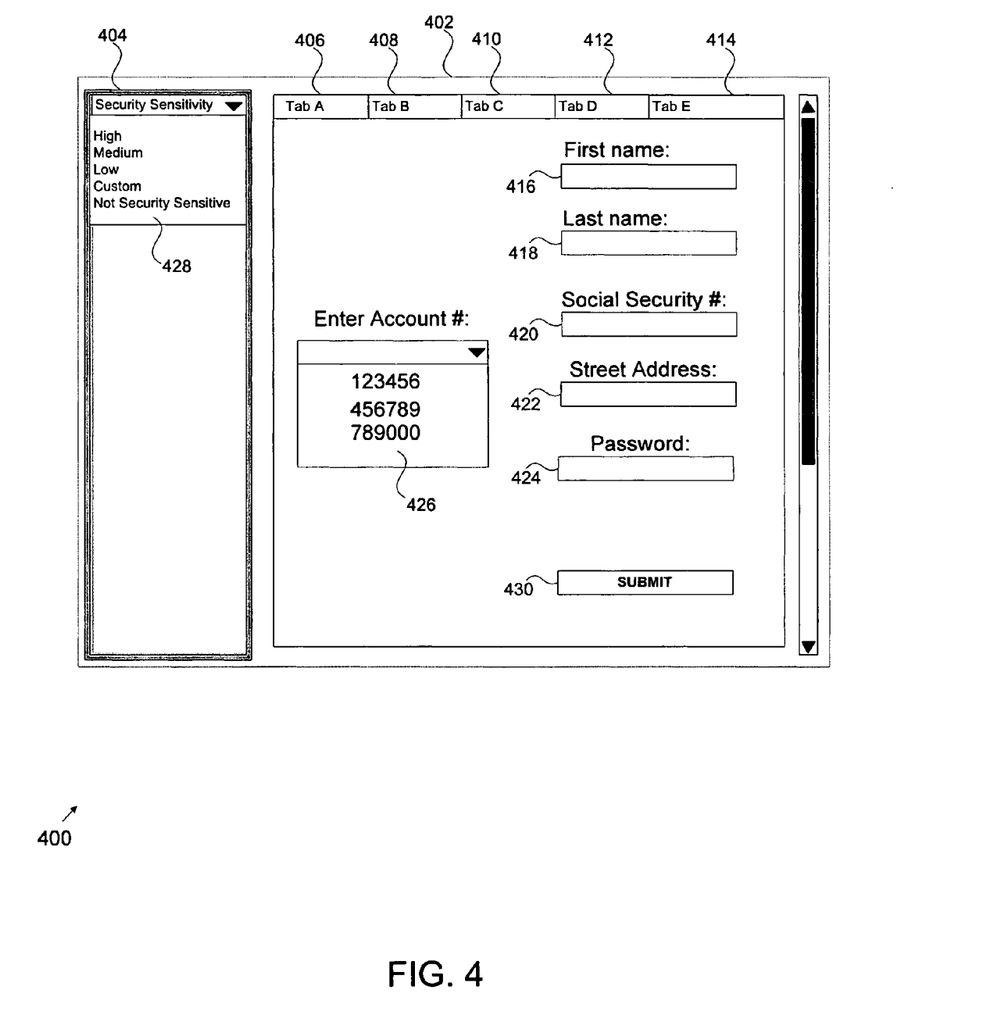
FIG. 4 illustrates an exemplary application user interface for classifying security sensitive information, in accordance with an embodiment.

FIG. 4 illustrates an exemplary application user interface for classifying security sensitive information, in accordance with an embodiment. Here, interface 400 is shown, including display 402, left window 404, tabs 406-414, form fields 416-424, pull-down menus 426-428, and button 430. In some examples, interface 400 may be a graphical user interface ("GUI") of an application-in-use (i.e., native application), where a user is performing various operations (e.g., creating, modifying, editing, deleting, adding or changing information and associated data in a document). Interface 400 may be implemented as a window, display, dialog box, or other interface. Interface 400 may be implemented to display one or more areas (e.g., display 402, left display window 404, and the like) and is not limited to the example shown. Similarly, left window 404 may be implemented as a sub-window or interface that is part of an overall larger interface (e.g., interface 400). As an example, tabs A-E (406-414) may represent functions, features, or selections that are available to a user in an application. Selection of these tabs may be used to provide functions, features, or selections that implement or aid classification of and policy application to security sensitive information. Here, tabs 406-414 are provided for illustrative purposes and may be varied accordingly.

In some examples, fields 416-424 may be used to enable a user to input information that may be classified as security sensitive. For example, field 420 is entitled "Social Security #:" and may be classified as security sensitive using one or more of the above-described techniques. As an example, form field and annotation definitions may be used to classify any information entered in the "Social Security #:" field (i.e., field 420) as security sensitive. When a user enters information in field 420 and "clicks" button 430 (i.e., selects using a mouse or other input tool that enables a user to choose button 430 to "submit" information as an action), keywords are inserted, tagged, marked, or appended to the security sensitive information. When the keyword-marked information is evaluated by classification module 210 (FIG. 2B), the keyword-marked information is determined to be security sensitive and a security sensitive category may be applied or specified by the keyword.

In some examples, information entered into field 420 may also be user-specified or default-indicated as security sensitive. Further, when information is entered into the document using field 420, a security sensitive category may be automatically assigned as a default setting for field 420. Alternatively, the native application presenting interface 400 may be implemented such that 416-424 are identified as security sensitive and any information entered is keyword-marked as security sensitive. In other examples, heuristics algorithms may be used to implement the application for interface 400 such that fields 416-424 recognize information entered as security sensitive if the information conforms to a particular form, pattern, or format (e.g., field 420 may be configured to recognize strings of numerical characters in the pattern "XXX-XXX-XXX" as a social security number). In other examples, left window 404 may provide options (e.g., pull-down menu 428) to a user that allows for the selection of the security sensitive category to be assigned to information entered using field 420. In still other examples, information cached from previous entries (e.g., pull-down menu 426) may be also marked (i.e., by using default, user-specified, system-determined, or other techniques as described above) as security sensitive.

Here, previously cached information stored and later retrieved using pull-down menu 426 may be marked as security sensitive. Each entry (e.g., "123456," "456789," "789000," and the like) may be assigned a security sensitive category. Further, each entry may also be assigned a different security sensitive category. Alternatively, depending upon the type of information entered (e.g., business address as opposed to a social security number), a different security sensitive category may be assigned. Still further, other techniques may be implemented beyond those described above. Additionally, interface 400 and the above examples and descriptions are provided for illustrative purposes only. Different interfaces, GUI designs, and applications may be used and implementations are not limited to the examples given. Classification and application of policies to security sensitive information may be varied beyond the examples described above.

Figure 5:
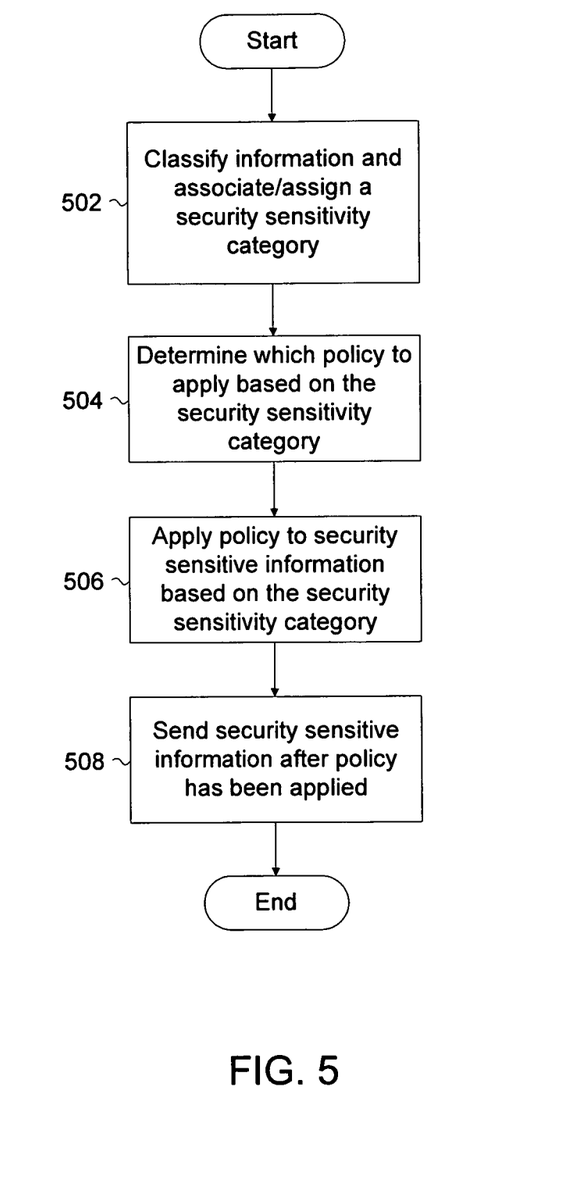
FIG. 5 illustrates an exemplary overall process for classification of security sensitive information and policy application, in accordance with an embodiment.

FIG. 5 illustrates an exemplary overall process for classification of security sensitive information and policy application, in accordance with an embodiment. In some examples, data associated with the security sensitive information is classified according to a security sensitive category (e.g., high, medium, low, custom, and others) (502). Based on the classification, a security policy may be determined (504). Once determined, one or more policies may be applied to secure, protect, or handle the information so as to ensure the information is not sent in an unsecure manner to its intended recipient (506). Policies may include sending the information over a secure transport layer (e.g., SSL, and others), encrypting the information at a data (i.e., message) level (e.g., encrypted FDF, XML, and others), or warning the user and offering an option to abort the data operation (e.g., sending the message or information). Here, the policies are applied on a subjective basis to an individual message, data packet, or transaction instead of relying upon blanket security techniques applied at an enterprise or network level. After applying one or more policies, the security sensitive information may be sent (508). Alternatively, after the policies have been applied, other data operations (e.g., continue using the security sensitive information in the current application, sharing the security sensitive information with other authorized users, and the like) may be performed. Other policies may be applied, including applying a particular encryption algorithm (e.g., automatically applying PKI encryption or other public/private key encryption), encrypting information using a server public key (e.g., keys stored in Adobe Acrobat's address book), creating a copy protection policy and applying encryption associated with the copy protection, or sending a warning or aborting a message if the intended recipient is using an untrusted domain. Other policies may be implemented and are not limited to the examples provided. Alternatively, for security sensitive categories, different policies may be applied.

Applying policies to security sensitive information having different security sensitive categories may include fewer, more, or different policies, depending upon the nature of the security sensitive information. For example, for information with a "high" or highly sensitive nature, if the intended recipient's server is a trusted (i.e., authenticated, authorized user of public/private key for encrypting data, and others) domain or if the associated data of the information is secure, then the information is sent. If the intended recipient is untrusted, then application-level security module 202 (FIG. 2A) may apply PKI encryption and, if successfully encrypted, the data is sent. If the data is not successfully encrypted, an attempt may be made to use a custom encryption policy (i.e., a policy for encrypting data specified by the user) or send the user a warning and abort the transmission or transaction. In other examples, the above-described process may be varied in implementation and operation and is not limited to the example described.

Figure 6:
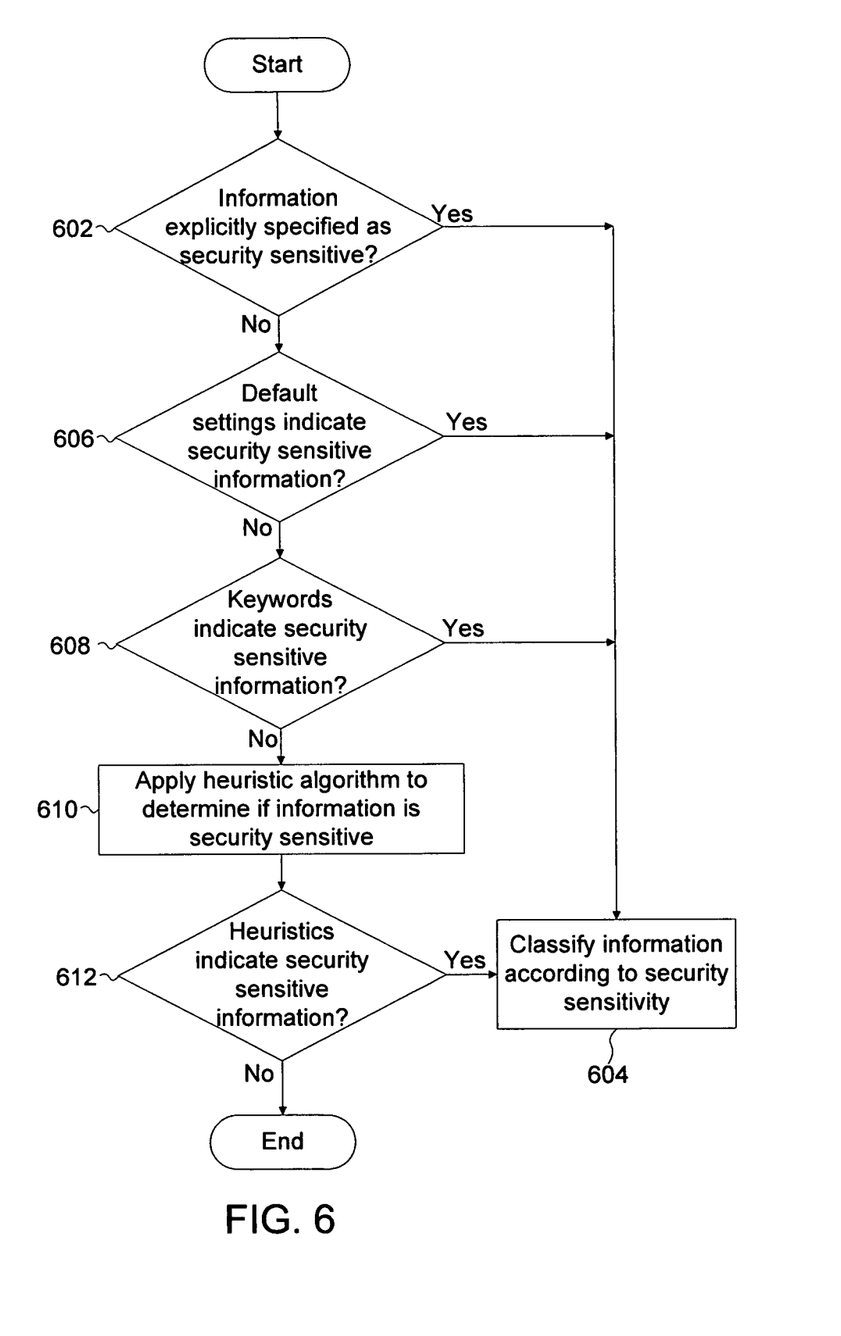
FIG. 6 illustrates an exemplary process for determining whether information is security sensitive, in accordance with an embodiment.

FIG. 6 illustrates an exemplary process for determining whether information is security sensitive, in accordance with an embodiment. Here, several inquiries may be made as part of the classification of information included in a message, document, transaction, or application. The below-described inquiries may be performed in an arbitrary or different order than presented and is not limited to the example given. In some examples, information is evaluated to determine whether it has been explicitly specified as security sensitive (602). If the information is explicitly-specified as security sensitive, then the information is classified as security sensitive (604). If the information is not explicitly-specified as security sensitive, then a check is performed to determine whether the information is security sensitive according to a default setting or parameter specified at the application level (606). If the information is security sensitive, according to a default setting or parameter, the information is then classified (604). However, if the information is not security sensitive according to a default setting or parameter, then a further check is performed to determine if a keyword indicating security sensitive information has been associated with the information (608). In other words, if the information based on a form field definition, annotation definition, table, or the like has been tagged with a keyword to indicate security sensitivity, then the information is classified as security sensitive (604). However, if this further evaluation does not determine whether the information is security sensitive, additional evaluation is performed by applying a heuristic algorithm to determine if security sensitive information is present (610). If one or more heuristic algorithms applied to the information yields security sensitive information (612), then classification is performed according to the security sensitive nature of the information (604). If the information is not security sensitive, then the process ends. In other examples, the process may include more or fewer evaluations to determine whether security sensitive information exists. In some examples, different evaluations may be performed, some of which have been described above, and others which may be further varied and implemented without restriction to the examples provided above.

Figure 7:
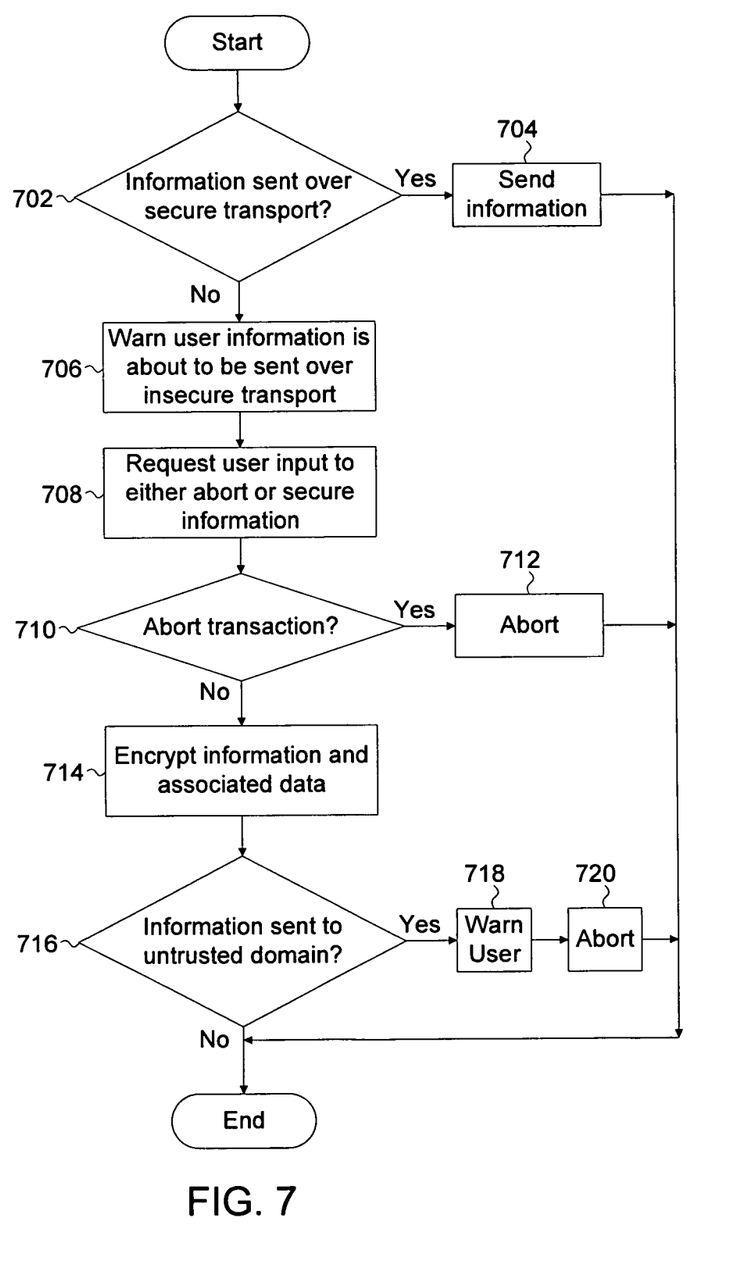
FIG. 7 illustrates an exemplary process for applying a policy to security sensitive information, in accordance with an embodiment.

FIG. 7 illustrates an exemplary process for applying a policy to security sensitive information, in accordance with an embodiment. Here, an example of policy application is described, but other examples may be designed, implemented, described, or varied and policy application processes are not limited to the descriptions provided. In some examples, a determination is made to determine whether the information is intended for a transmission or transaction performed/sent over a secure transport layer (e.g., SSL, TLS, and the like) (702). If the information is to be sent over secure transport, then the information is sent (704). However, if the information is not sent over a secure transport layer, medium, tunnel, or the like, then the user is warned that the information is about to be sent over unsecure transport (706). Further, a request to the user is made for input as to whether abort the transmission (or transaction) or to secure the information (708). In some examples, securing information may include applying cryptographic measures (e.g., public or private key encryption algorithms) to encrypt the information to protect the information from intercept, capture, or interruption from unwanted parties.

Here, a determination is made, based on user input, whether the information is to be aborted (710). If the user provides input (i.e., via a user interface, "pop-up" window, or other display) to abort, then the message transmission or transaction is aborted, preventing unsecure information from being sent (712). If the user intends to secure the information, then encryption (e.g., PKI encryption) may be applied to the information and associated data (714). Once encrypted, a determination as to whether the information is to be sent to an "untrusted" domain (e.g., a domain or address that is not known to the user or is suspicious due to the detection of spoofing, pharming, phishing, or other deceptive techniques) (716). If the intended recipient's domain of the security sensitive information is untrusted, then a warning is issued to the user (718). Further, the message transmission or transaction is aborted (720). Alternatively, if the domain is trusted (i.e., known), then the message transmission or transaction is performed (510, FIG. 5). In other examples, the above-described process may be varied in design, implementation, and execution and is not limited to the examples provided.

Figure 8:
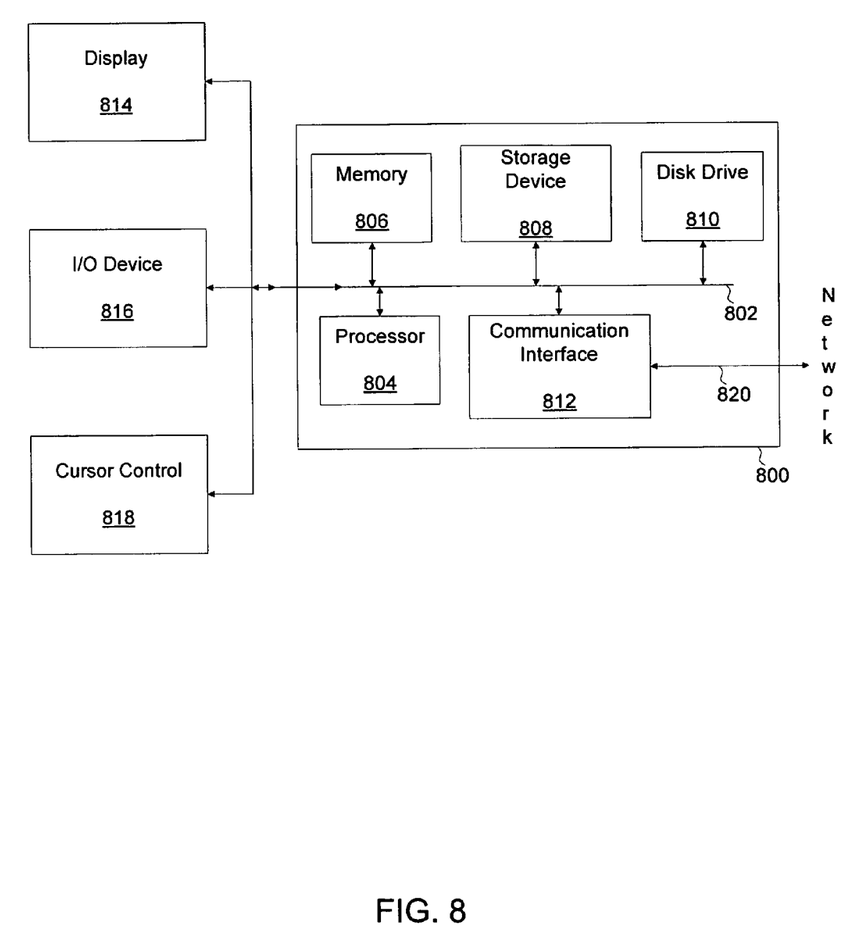
FIG. 8 illustrates an exemplary computer system suitable for classification of security sensitive information and application of customizable security policies, in accordance with an embodiment.

FIG. 8 illustrates an exemplary computer system suitable for classification of security sensitive information and application of customizable security policies, in accordance with an embodiment. In some examples, computer system 800 may be used to implement computer programs, applications, methods, processes, or other software to perform the above-described techniques. Computer system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball).

According to some examples, computer system 800 performs specific operations by processor 804 executing one or more sequences of one or more instructions stored in system memory 806. Such instructions may be read into system memory 806 from another computer readable medium, such as static storage device 808 or disk drive 810. In some examples, hard-wired circuitry may be used in place of or in combination with software instructions for implementation.

The term "computer readable medium" refers to any medium that participates in providing instructions to processor 804 for execution. Such a medium may take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 800. According to some examples, two or more computer systems 800 coupled by communication link 820 (e.g., LAN, PSTN, or wireless network) may perform the sequence of instructions in coordination with one another. Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:

performing, by one or more computers:

classifying information as security sensitive at an application level of an application, the security sensitive information being associated with a security sensitive category, wherein the security sensitive information is either user-specified as security sensitive or system-specified as security sensitive;

in response to an attempt to send data over a network to a domain via the application, determining at the application level whether the data includes any information classified as security sensitive information;

in response to determining that the data includes security sensitive information, determining at the application level a security policy for the security sensitive information;

applying the security policy at the application level to the security sensitive information, wherein applying the security policy comprises:

determining, at the application level, whether the security sensitive information is to be sent over a secure transport layer and whether the domain is trusted; and in response to determining that the security sensitive information is not to be sent over the secure transport layer, encrypting the security sensitive information at the application level; and in response to determining at the application level that the domain is trusted, sending the encrypted security sensitive information to that domain, wherein the encrypted security sensitive information is not sent to the domain if the domain is not determined at the application level to be trusted.

2. The method recited in claim 1, wherein classifying the information at the application level further comprises evaluating the information to determine whether said information is user-specified as security sensitive.

3. The method recited in claim 1, wherein classifying the information at the application level further comprises evaluating the information to determine whether said information is system-specified as security sensitive.

4. The method recited in claim 1, wherein classifying the information at the application level further comprises evaluating the information to determine whether a default setting indicates the information is security sensitive.

5. The method recited in claim 1, wherein classifying the information at the application level further comprises evaluating the information to determine whether a keyword indicates the information is security sensitive.

6. The method recited in claim 1, wherein classifying the information at the application level further comprises applying a heuristic algorithm to the portion of information to determine whether the information is security sensitive.

7. The method recited in claim 1, wherein classifying the information at the application level further comprises identifying the information as security sensitive information based on a message.

8. The method recited in claim 1, wherein classifying the information at the application level further comprises identifying the information as security sensitive information based on a transaction.

9. The method recited in claim 1, wherein determining that the security sensitive information is not to be sent over the secure transport layer comprises determining that the security sensitive information is not to be sent over a secure transport layer.

10. The method recited in claim 1, wherein applying the policy to said information at the application level further comprises issuing a warning.

11. The method recited in claim 1, wherein the method comprises aborting the sending of the encrypted security sensitive information after said sending is initiated.

12. The method recited in claim 1, wherein the method comprises aborting the sending of the encrypted security sensitive information if it is determined that the security policy was not applied correctly.

13. The method recited in claim 1, wherein the method comprises sending said encrypted security sensitive information to a particular intended recipient within said domain after the security policy has been applied.

14. The method recited in claim 1, wherein applying the policy to the security sensitive information at the application level further comprises evaluating said information to determine whether an intended recipient of said information is associated with an untrusted domain.

15. The method recited in claim 1, wherein applying the policy to the security sensitive information at the application level further comprises aborting sending said information if the intended recipient is associated with an untrusted domain.

16. A system, comprising:

a memory storing executable instructions;

a processor configured to execute the instructions to:

classify information as security sensitive at an application level of an application, the security sensitive information being associated with a security sensitive category, wherein the security sensitive information is either user-specified as security sensitive or system-specified as security sensitive;

in response to an attempt to send data over a network to a domain via the application, determining at the application level whether the data includes any information classified as security sensitive information;

in response to determining that the data includes security sensitive information, determine at the application level a security policy for the security sensitive information;

apply the security policy at the application level to the security sensitive information, wherein to apply the security policy the instructions are executable by the processor to:

determine, at the application level, whether the security sensitive information is to be sent over a secure transport layer and whether the domain is trusted;

in response to determining that the security sensitive information is not to be sent over the secure transport layer, encrypting the security sensitive information at the application level; and in response to determining at the application level that the domain is trusted, sending the encrypted security sensitive information to that domain, wherein the encrypted security sensitive information is not sent to the domain if the domain is not determined at the application level to be trusted.

17. A method, comprising:

performing by one or more computers:

classifying information as security sensitive at an application level of an application, the security sensitive information being associated with a security sensitive category, wherein the security sensitive information is either user-specified as security sensitive or system-specified as security sensitive;

in response to an attempt to send data over a network to a domain via the application, determining at the application level whether the data includes any information classified as security sensitive information;

in response to determining that the data includes security sensitive information, determining at the application level a security policy specifying public key encryption for the security sensitive information;

applying the security policy at the application level to the security sensitive information, wherein applying the security policy comprises:

determining, at the application level, whether the security sensitive information is to be sent over a secure transport layer and whether the domain is trusted;

in response to determining that the security sensitive information is not to be sent over the secure transport layer, encrypting the security sensitive information at the application level according to the public key encryption specified by the security policy; and in response to determining at the application level that the domain is trusted, sending the encrypted security sensitive information to that domain, wherein the encrypted security sensitive information is not sent to the domain if the domain is not determined at the application level to be trusted.

18. The method recited in claim 17, wherein said sending comprises sending said security sensitive information to a particular intended recipient within the domain after the security policy has been applied.

19. The method recited in claim 17, further comprising aborting the sending of the security sensitive information to the intended recipient if it is determined that the security policy is not applied correctly.

20. A system, comprising:
one or more computers, comprising:
a classification module executable on said one or more computers, the classification module configured to classify information as security sensitive at an application level of an application, the security sensitive information being associated with a security sensitive category, and wherein the security sensitive information is either user-specified as security sensitive or system-specified as security sensitive;
wherein the classification module is further configured to, in response to an attempt to send data over a network to a domain via the application, determining at the application level whether the data includes any information classified as security sensitive information
wherein the classification module is further configured to, in response to determining that the data includes security sensitive information, determining at the application level a security policy specifying public key encryption for the security sensitive information;
a policy application module executable on said one or more computers, the policy application module configured to apply the security policy at the application level to the security sensitive information, wherein to apply the security policy the policy application module is further configured to:
determine, at the application level, whether the security sensitive information is to be sent over a secure transport layer and whether the domain is trusted;
in response to determining that the security sensitive information is not to be sent over the secure transport layer, encrypt the security sensitive information at the application level according to the public key encryption specified by the security policy; and an application interface module executable on said one or more computers to, in response to a determination at the application level that the domain is trusted, send said encrypted security sensitive information to that domain, wherein the encrypted security sensitive information is not sent to the domain if the domain is not determined at the application level to be trusted.

21. A non-transitory computer readable storage medium storing computer instructions that when executed by a computer implement:
classifying information as security sensitive at an application level of an application, the security sensitive information being associated with a security sensitive category, wherein the security sensitive information is either user-specified as security sensitive or system-specified as security sensitive;
in response to an attempt to send data over a network to a domain via the application, determining at the application level whether the data includes any information classified as security sensitive information;
in response to determining that the data includes security sensitive information, determining at the application level a security policy for the security sensitive information;
applying the security policy at the application level to the security sensitive information, wherein applying the security policy comprises:
determining, at the application level, whether the security sensitive information is to be sent over a secure transport layer and whether the domain is trusted;
in response to determining that the security sensitive information is not to be sent over the secure transport layer, encrypting the security sensitive information at the application level; and
in response to determining at the application level that the domain is trusted, sending the encrypted security sensitive information to that domain, wherein the encrypted security sensitive information is not sent to the domain if the domain is not determined at the application level to be trusted.

22. A non-transitory computer readable storage medium storing computer instructions that when executed by a computer implement:
classifying information as security sensitive at an application level of an application, the security sensitive information being associated with a security sensitive category, wherein the security sensitive information is either user-specified as security sensitive or system-specified as security sensitive;
in response to an attempt to send data over a network to a domain via the application, determining at the application level whether the data includes any information classified as security sensitive information;
in response to determining that the data includes security sensitive information, determining at the application level a security policy specifying public key encryption security sensitive information;
applying the security policy at the application level to the security sensitive information wherein applying the security policy comprises:
determining, at the application level, whether the security sensitive information is to be sent over a secure transport layer and whether the domain is trusted;
in response to determining that the security sensitive information is not to be sent over the secure transport layer, encrypting the security sensitive information at the application level according to the public key encryption specified by the security policy; and in response to determining at the application level that the domain is trusted, sending the encrypted security sensitive information to that domain, wherein the encrypted security sensitive information is not sent to the domain if the domain is not determined at the application level to be trusted.

* * * * *